United States Patent [19]

Mitchell

[11] Patent Number: 5,117,102

[45] Date of Patent: May 26, 1992

[54] PHOTOELECTRIC JOYSTICK DISPLACEMENT DETECTOR

[76] Inventor: Randall K. Mitchell, 3840 Hillside La., Salt Lake City, Utah 84109

[21] Appl. No.: 621,008

[22] Filed: Nov. 30, 1990

Related U.S. Application Data

[63] Continuation-in-part of Ser. No. 444,705, Dec. 1, 1990, abandoned.

[51] Int. Cl.$^5$ ............................................. G01D 5/34
[52] U.S. Cl. ................................... 250/229; 250/221
[58] Field of Search ............... 250/221, 229; 340/709, 340/710; 341/31

[56]  References Cited

U.S. PATENT DOCUMENTS

| | | | |
|---|---|---|---|
| 3,521,072 | 7/1970 | Wipson | 250/221 |
| 3,814,199 | 6/1974 | Jones | 250/229 |
| 4,284,885 | 8/1981 | Swensen | 250/229 |
| 4,607,159 | 8/1986 | Goodson et al. | 250/229 |
| 4,742,221 | 5/1988 | Sasaki et al. | 250/221 |
| 4,818,859 | 4/1989 | Hough | 250/221 |
| 4,831,359 | 5/1989 | Newell | 250/229 |
| 4,912,316 | 3/1990 | Yamakawa | 250/221 |

Primary Examiner—David C. Nelms
Attorney, Agent, or Firm—James L. Sonntag

[57] ABSTRACT

An electronic device which optically determines the relative position of a joystick using one or more sets of light emitters and light detectors. This device simulates the closing and opening of electromechanical switches without any physical contact with the joystick control shaft. Light beams are selectively blocked or allowed to shine on the opposing photo-detector of a set by movement of the joystick. When the photo-detector receives sufficient light a logic high is lowered to a logic low allowing more current to flow through it, thus simulating the closure of a mechanical switch. From the "open" or "closed" states of the photo-detectors, the displacement of the control shaft may be determined. The sensitivity may be easily changed, or the controller changed between a 4-way and 8-way controller by altering the outer diameter of the control shaft, such as by an interchangeable bushing.

21 Claims, 10 Drawing Sheets

PHOTOELECTRIC JOYSTICK DISPLACEMENT DETECTOR

This application is a continuation-in-part of Ser. No. 444,705 filed Dec. 1, 1990, now abandoned.

FIELD OF THE INVENTION

The present invention relates to joystick control devices, and the like, for the detection of the displacement of the joystick control shaft.

BACKGROUND OF THE INVENTION

Typically a joystick-type control device, as used in video arcade games, comprises a pivotable control shaft which mechanically depresses electrical contacts to provide an indication of the position of the control shaft. For most Video arcade games, the electronic circuitry requires on/off-type input signals to indicate the position of the joystick, as exemplified by input from simple on/off single-pole, single-throw mechanical switches.

A typical example of a joystick device in commercial production, which uses such mechanical switches, is illustrated in U.S. Pat. No. 4,436,971, to Kim. This patent describes a pivoted control shaft, which when pivoted will close one or two of four leaf spring switches. The leaf spring switches are normally in an open condition, and when the control shaft is displaced, one or two switches are depressed and closed to provide a detection of the displacement of the control shaft. Electromechanical detection devices, such as disclosed in the Kim patent, are popular because they are simple and inexpensive to manufacture. In addition, the electrical output for the displacement indication of the control shaft is a digital output through simple on/off switches, so these devices are readily adapted to use with arcade game digital circuit applications, without additional circuitry to condition the output of the joystick detector.

While in general, electromechanical devices such as illustrated in the Kim patent are successful in determining the position of the control shaft, they suffer from many shortcomings. One problem is that, since they are mechanical devices, they are particularly subject to an increase in the resistance of the switch contacts, due to, for example, wear, misalignment, oxidation, accumulation of dirt, and the like, upon the switch contacts. As the contact resistance increases, the switch begins to fail on an intermittent basis. Such intermittent failure can be a particular problem in fast-action arcade game applications where even a rare failure can mean "life or death" for an arcade character. In addition, such mechanical switches are subject to total failure due to breakage of a switch component, contact resistance, or elimination of the gap between the contacts due to bending of the switch contact springs, and the like.

Even when new, any type of mechanical switch is subject to "switch bounce." This effect is characterized by the voltage oscillating up and down between the "on-state" voltage and the "off-state" voltage for several milliseconds. This effectively causes a slowing of the response time and an imprecise indication of the moment of movement of the joystick control.

Another problem is due to the inherent variation from one switch to another, which causes inconsistent and uneven indication of the control shaft displacement. The variation is due not only to wear and misalignments from repeated use of the switch, but also due to unavoidable variations introduced in the switches during manufacture and installation. For example, in the typical four switch indicator as in the above patent to Kim, there will inherently be some variation in the gap between the contacts, variation in the spring stiffness, variation in travel distance to the initial point of contact of the leaf springs with the controller, and etc. The variations in the switches are a problem because they result in different sensitivities for each switch, which in turn causes uneven and inconsistent indications of the position of the control shaft. By "sensitivity" is meant the distance required to displace the control shaft from the neutral position to electrically close the switch. Since sensitivity is dependent upon factors which are difficult to control, construction of a joystick displacement detection mechanism from mechanical switches which has a predetermined and consistent sensitivity is difficult.

As an illustration how variations in the switches cause inconsistent position indication; in a so-called eight-sector joystick, as disclosed in the above Kim patent, the x-axis displacement is detected by two laterally placed switches, which are respectively closed as the control shaft is moved left and right. If one switch is less sensitive than the other the position indication will not be consistent for both directions. The same applies to two y-axis detection switches for the up/down motion. The net result is inconsistent indication in the four directions. The problem is aggravated even more for the corner (45°) indications. In each of these indications, the control shaft must simultaneously depress a switch from the x-axis set and from the y-axis set. Since two switches are involved, problems due to variation in both the switches are multiplied. If, for example, one of the switches requires a longer travel to close than the other, the corner indication will be different coming from different directions. In addition, if both switches require a relatively long travel to close, they will both be quite insensitive, and the corner indication can only be achieved with difficulty by a "hard" or extreme displacement into the corner position.

In addition, the lack of control over sensitivity does not allow fine adjustment of the sensitivity. For example, for particular video games, a high sensitivity, or "hair trigger" action is desirable, but this is difficult to achieve and maintain with the mechanical switching mechanisms.

While the sensitivity can be adjusted for most mechanical switches, it is usually hit and miss, and it is very difficult to achieve a desired and equal sensitivity for the four switches in a joystick detector. In addition, due to use, the sensitivity changes over time and the switches must be continually monitored and adjusted. A constant cleaning and adjustment of the detector switches in a heavily used arcade game is not unusual.

Variation in switch sensitivity and inconsistency in the detection of the displacement is frustrating to a user of an arcade game. In particular when the game is fast paced and doesn't allow time for compensation by the user. Due to the inherent variation and change over time of switch sensitivity, together with the increase in contact resistance and breakage, the joystick controller can become marginal or even unsuitable for an arcade game. Such a marginal controller may detract from enjoyment and operability of the game to such a degree that users may abandon play of the game, resulting in a loss of revenues to the game owner.

It would be desirable to have a displacement detector does not have the problems of detectors which use mechanical switches. Such a detector would preferably be simple and adaptable to most joystick constructions commonly used, and preferably be made as a direct replacement of the mechanical switches in existing joysticks. That would require a detector with a digital output, simulating the same on/off output of a mechanical switch detector with the neutral position of the joystick indicated by all detection circuits in an off state. In addition, the detector should preferably be simple to manufacture, and not require extensive circuitry in the form of modifying or conditioning circuits to achieve the proper output for an arcade game. The detector should be so constructed to be readily incorporated into existing arcade games, without extensive modification of the circuitry or the mechanical joystick control units. The detector should have little degradation of performance, even after long use in arcade applications, and require little or no maintenance. The sensitivity should be easily set to a desired level and be consistent and not degrade over time. The detector should be easily adaptable to either 4-way and 8-way detection, as required by the particular arcade game.

Higher quality mechanical switches have been used, such as for example, microswitches (i.e. "Cherry" switches). This may reduce the problems, but the inherent problems in mechanical switching devices persist, such as unreliable and inconsistent performance over time and between individual switches, switch bounce, and lack of control over sensitivity.

Control devices have been made which lack mechanical switches. However, these devices are not readily adapted to arcade applications, and would require extensive modification or total replacement of existing arcade circuitry and the joystick controls. Moreover, they typically do not have a suitable digital output to be compatible with current arcade game standards, unless complex conditioning circuitry is added. In addition, the mechanical construction is usually complex and is not consistent with current arcade joystick standards.

U.S. Pat. No. 3,814,199, to Jones, discloses motor control system for an electrically driven vehicle, such as a wheel chair. The control systems includes a joystick control using four optical emitter/detector sets aligned with their axes generally parallel to the axis of the joystick control shaft. The control shaft is constructed, preferably with a mask, to provide a variation in the magnitude of light reaching light detector. The magnitude of the output from the detector is thus a function of the joystick position, with a decreasing or increasing amount of light reaching the detector as the joystick is moved from the neutral position. The analog output of the light detectors is then applied to a motor speed control circuit which contain logic circuitry to determine the speed and direction of the direct-current motors which drive the vehicle.

U.S. Pat. No. 4,607,159, to Goodson et al., discloses an optical joystick controller using a light source and a light detector. A joystick control shaft acts as a shutter adapted to move between a light source/detector set. The movement causes the amount of light falling upon the detector to vary with the position of the control shaft. The variation in light results in an analog electrical signal from the detector which indicates the degree of control shaft displacement. The Goodson et al. photo-electric detector eliminates mechanical switches and potentiometers, but at the cost of more complexity. The output of this device is analog, and in order to provide the digital output suitable for arcade games would require expensive integrating and conditioning circuits. In addition, the light source/detector set requires precise alignment and control of magnitude of the intensity of the light beam in order for this controller to function. This requires, for example, a complex construction of collimating and focusing lenses to provide a suitably intense and narrow beam so that there is a measurable variation of the beam intensity from movement of the control shaft. The complex light detector system can be used only with a joystick controller shaft assembly specifically constructed for the use in the Goodson et al. system, and cannot be easily incorporated into the current arcade applications without extensive mechanical and electrical modifications.

U.S. Pat. No. 4,250,378 to Mutton discloses a photoelectric joystick for producing a digital signal representative of the position of the joystick. Light sensitive elements are in array on a plane, and the position of the joystick is detected by the shadow of the joystick on the array. The Mutton photoelectric detection system is relatively complex, requiring an array of photo-detectors for each plane, each array with several photodetectors. This construction is complex and is not easily adaptable to current joystick construction standards, and does not have the required electrical output suitable for arcade game applications.

U.S. Pat. No. 4,731,530 to Mikan discloses a joystick with an optical position indication comprising a means for dividing a light beam, a means for varying one part of the beam which is responsive to movement, and means for effecting a beam of predetermined intensity from the other beam part. The Mikan system requires specialized construction with complicated beam splitters and a screen with variable light transmittance. In addition, the electrical output is an analog signal which would require modification for a digital video arcade system.

U.S. Pat. No. 4,533,827 to Fincher discloses a joystick comprising a spherical surface which moves with movement of the joystick. The spherical surface is variable in an optical property over the surface. When the sphere is tilted from movement of the joystick, a photodetector measures the variation in the optical property, thus indicating the position of the joystick. The electrical output is analog, and would require modification for application in an arcade system. In addition, the construction of the Fincher device is complicated and this system would not be adaptable to the construction of generally available joysticks.

U.S. Pat. No. 4,748,323 to Holiday discloses a joystick device with photoelectric detection which comprises a plurality of emitter/detector sets disposed around a control shaft. In the illustrated embodiment, the emitter/detector sets are disposed on an axis generally parallel to the axis of the joystick. As the control shaft moves, a blocking member attached to the control shaft, in the form a thin plastic disc, selectively blocks light passing to one or two detectors. In order for the Holiday device to simulate the output of a mechanical detector such as the Kim device, above, a conditioning or signal processing circuit must be used. A complex circuit is disclosed which includes an amplifier connected across the detector, a Schmidt-trigger connected to the output of the amplifier, a transistor connected to the output of the Schmidt-trigger, and a voltage regulated power supply.

The above prior-art photoelectric joysticks are generally not suitable for arcade game applications. The outputs are analog and the mechanical construction of each is not compatible with currently used joystick controllers. Fitting these controllers into an arcade game would require extensive modification or replacement of the electrical circuits and the mechanical joystick controls.

OBJECTS OF THE INVENTION

It is, therefore, an object of the invention to provide a displacement detector which is adaptable to present day joystick construction and can be used as a direct replacement for the mechanical switch detector of commercially made joysticks.

It is also an object of the invention to provide a displacement detector with more consistent performance, and higher reliability than systems with mechanical switches.

It is also an object of the invention to provide a displacement detector, wherein the sensitivity is consistent and can be set to a predetermined level.

In is also an object of the invention to provide a displacement detector that can be easily adopted to either an 8-way or a 4-way arcade application.

It is also an object of the invention to provide a displacement detector which simulates a digital on/off output suitable for arcade game applications without requiring modifying or conditioning circuits for the output.

It is also an object of the invention to provide a displacement detector requiring a minimum of maintenance.

It is also an object of the invention to provide a displacement detector which is simple in construction and can be mass-produced at a relatively low cost.

Other objects of the invention will become evident in the discussion that follows.

SUMMARY OF THE INVENTION

An embodiment of the invention is a photoelectric control device for determining the displacement of a control shaft, which device comprises;

(a) an x-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, (b) a y-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, wherein the light axes of the emitter/detector sets of the x-axis detector and the light axes of the emitter/detector sets of the y-axis detector are substantially perpendicular to each other, and the plane defined by the parallel light axes of the x-axis emitter/detector sets and the plane defined by the parallel y-axis emitter/detector sets are adapted to be disposed in a substantially perpendicular to the longitudinal axis of a control shaft when the control shaft is in the neutral position, and wherein the x-axis detector and the y-axis detector are adapted to detect displacement of the control shaft from a neutral position blocking passage of light from each photo-emitter to the corresponding photo-detector in the emitter/detector set, and the displacement of the control shaft from the neutral position allows passage of sufficient light from a photo-emitter to activate the corresponding photo-detector in at least one emitter/detector set.

Another embodiment of the invention is a joystick control device comprising;

(1) a joystick comprising a handle end adapted for user manipulation, a pivot point, and a control shaft portion, (2) a joystick mounting means cooperatively attached to the joystick pivot point to permit angular movement of the joystick around the pivot point by manipulation of the handle end wherein the control shaft portion is displaced by the angular movement, (3) a displacement detector comprising (a) an x-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, (b) a y-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, wherein the light axes of the emitter/detector sets of the x-axis detector and the light axes of the emitter/detector sets of the y-axis detector are substantially perpendicular to each other, and the plane defined by the parallel light axes of the x-axis emitter/detector sets and the plane defined by the parallel y-axis emitter/detector sets are disposed substantially perpendicular to the longitudinal axis of the control shaft when the control shaft is in the neutral position, and wherein the x-axis detector and the y-axis detector are adapted to detect displacement of the control shaft from a neutral position blocking passage of light from each photo-emitter to the corresponding photo-detector in the emitter/detector set, and the displacement of the control shaft from the neutral position allows passage of sufficient light from a photo-emitter to activate the corresponding photo-detector in at least one emitter/detector set.

A photo-emitter/detector set comprises a photo-emitter and a photo-detector. The photo-emitter may be any suitable light source, such as, for example, a light emitting diode or a tungsten bulb. The photo-detector may be any suitable light detecting device, for example, a photodiode, phototransistor, or a photodarlington. The photo-emitter and photo-detector of each set are disposed along a light axis such that light emitted along a light axis by the photo-emitter is detected by the photo-detector. The light axes of the two emitter/detector sets are disposed essentially parallel to one another. Some deviation from the parallel may be tolerated and still have an operable device. The requirement is that a control shaft in a neutral position blocks both light axes, and lateral displacement in either direction selectively allows the passage of light along one of the light axes. The magnitude of the deviation from parallel depends on the accuracy desired of the position detector, as well as the dimensions of the detector, and the control shaft. Optionally, rather than two emitters to form the two sets, each emitter/detector set may share a common photo-emitter with both light axes of each emitter/detector sets extending from the common emitter at an acute angle between the light axes. Such an arrangement of the emitter/detector sets would be considered to be within the definition of "essentially parallel light axes". An example of this embodiment is described below in the discussion for FIG. 6.

The two emitter/detector sets of a displacement detector are disposed to detect displacement of a control shaft from a neutral position blocking the passage of light along the light axes of all of the emitter/detector sets. In the neutral position, the control shaft blocks the lights axes, preventing sufficient light from reaching either of the photo-detectors. While some light from the light-emitters and other sources may reach the light-detectors when the control shaft is the neutral position, the value of light is insufficient to activate the light-detector. Displacement from the neutral position, i.e. in a direction not parallel to a particular light axis, allows sufficient light to pass along that axis to the corresponding photo-detector to activate the detector. By "activate" is meant that sufficient light reaches the light-detector such that it provides an electronic indication of the light. The activation of the light-detector thus provides an electronic signal of the displacement.

The joystick control may have one or more light emitter/detector sets selectively arrayed around a joystick control shaft, thus detecting displacement in one or more axes or directions, as the control shaft blocks or allows light to pass to various photo-detector in response to movement of the joystick. In a preferred embodiment, the portion of the control shaft that selectively blocks the light may also have a replaceable bushing. As described more fully below, the sensitivity can be altered by changing the outside diameter of the control shaft. In addition, by changing the outside diameter of the control shaft, the detector can be changed from an 8-way to a 4-way detector. Thus, through interchangeable bushings of different diameters, it is possible to easily change the sensitivity of the detector, or change the detector between 4-way and 8-way.

DESCRIPTION OF THE INVENTION

Figure 1:
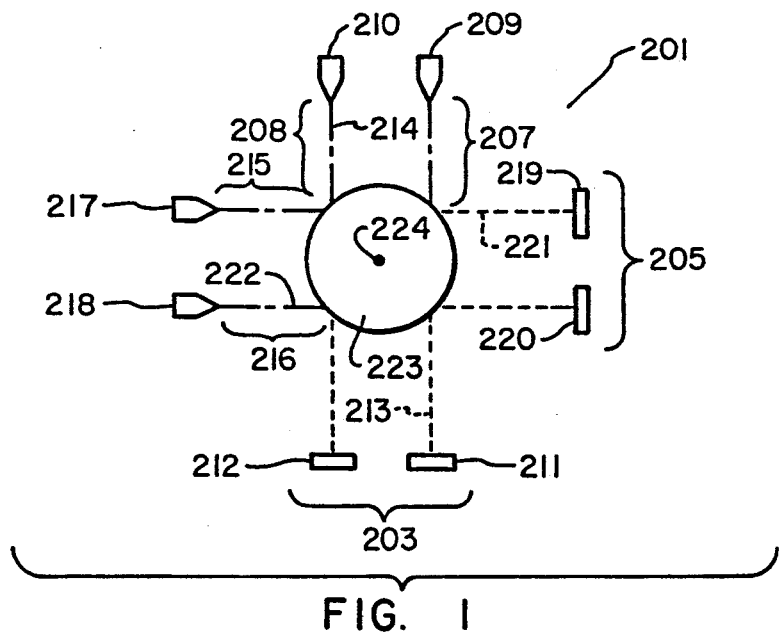
FIG. 1 is a schematic an embodiment of the invention.

FIG. 1 shows an embodiment of the invention which can be used as a 4-way or 8-way detector. Shown is a photoelectric control device 201 comprising an x-axis (left/right) detector 203 and a y-axis (up/down) detector 205. The x-axis detector 203 comprises two photo-emitter/detector sets 207, 208, each set comprising a photo-emitter 209, 210 and a photo-detector 211, 212. The photo-emitter 209, 210 and photo-detector 211, 212 in each set 207, 208 are aligned on a light axis 213, 214, such that light emitted from a photo-emitter 209, 210 and traveling along the respective light axis 213, 214 is detected by the respective photo-detector 211, 212, of the same set 207, 208. The light axes 213, 214 of each set are substantially parallel to one another.

The y-axis detector 205 similarly comprises two photo-emitter/detector sets 215, 216 with each set comprising a photo-emitter 217, 218 and a photo-detector 219, 220. The photo-emitter 217, 218 and photo-detector 219, 220 are aligned on substantially parallel light axes 221, 222.

The light axes 213, 214 of the emitter/detector sets 207, 208 of the x-axis detector 203 are substantially perpendicular to the light axes 221, 222 of the emitter/detector sets 215 of the y-axis detector 205. This arrangement is adapted to detect displacement along two axes of a control shaft 223 from a neutral position The neutral position is where the control shaft 223 sufficiently blocks passage of light along light axes 213, 214, 221, 222 from each photo-emitter 209, 210, 217, 218 to the corresponding photo-detector 211, 212, 219, 220 in each emitter/detector set 207, 208, 215, 216 so as to prevent activation of the photo-detectors 211, 212, 219, 220. The neutral position 224 in the FIG. is indicated by the location of the center of the control shaft 223 when in the neutral position A sufficient displacement of the control shaft 223 from the neutral position 224 allows passage of sufficient light along one the of the light axes 213, 214, 221, 222 in one of the emitter/detector sets 207, 208, 215, 216 in either or both the x-axis and y-axis detectors 203, 204, 205, 206. Sufficient light thus falls upon one or two photo-detectors 211, 212, 219, 220 to activate the photo-detector and provide an indication of the displacement.

The CPUs of most video arcade games have four control logic ports that have a logic high potential, typically +5 volts. When the logic high potential is lowered to a logic low voltage, a command or function is initiated until the potential is raised beyond a threshold voltage to the logic high. The logic low for most of the recent arcade game CPUs must be less than about 0.3 volts to initiate a command. However, many games, particular the older games, the logic low may only be less than about 1.5 volts. Usually in prior-art arcade controllers, the control of the potential is by mechanical switches. Typically, the four ports are designated up, down, left and right, for movement of video characters or the firing of projectiles. Thus, to indicate the displacement of a joystick in one direction or another, the joystick controller merely needs to take a +5 volt logic high to a logic low at the appropriate port. As mechanical switches age, the logic low, which is achieved by closing of the switch, becomes more difficult to achieve as corrosion and wear increase the resistance of the switch contacts. The present invention avoids this problem by using solid state photoelectric devices which are not subject to such mechanical wear and deterioration.

In a preferred embodiment the +5 volt logic high is connected to the collector of a simple n-p-n transistor. A photodarlington has its anode connected to the base of the n-p-n transistor and cathode side connected to +5 volts, with the emitter of the transistor connect to ground. When sufficient light falls on the photodarlington, current flows through the photodarlington to the base of the n-p-n transistor. When the current flow from the photodarlington biases the base of the transistor, the voltage across the collector and emitter of the transistor ($V_{CE}$) falls to less then 0.2 volts, resulting in the logic high of +5 volts becoming a logic low of less than 0.2 volts.

Figure 1A:
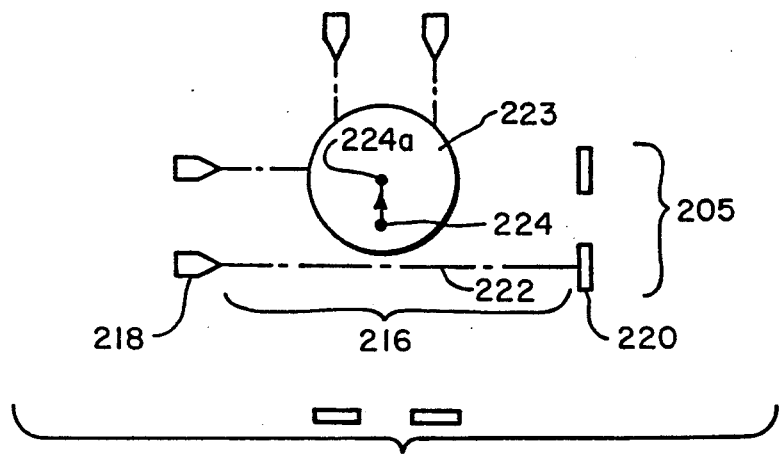
FIG. 1a is a schematic view as in FIG. 1 showing displacement of the control shaft.

In a preferred embodiment, such as illustrated in FIG. 1, four photo-emitter/detector sets are arranged so a diagonal movement of the control stick (e.g. 45° between the x- and y- axes) will trigger two adjacent detectors. Some video games will initiate a 45° command when two +5 Volt logic ports go to ground. Thus, the configuration shown in FIG. 1 is suitable for both 4-way and 8-way controllers. In a 4-way controller, displacement from the neutral position is detected for movement either along the x-axis or along the y-axis. For example, refer to FIG. 1a, which is the embodiment of FIG. 1 with an upward displacement of the control shaft 223 from the neutral position 224 along the y-axis (to 224a as shown by the arrow). The displacement allows sufficient light to pass along the light axis 222 for the lower emitter/detector set 216 in the y-axis displacement detector 205. The photo-detector 220 is activated thus providing an indication of the displacement.

Figure 1B:
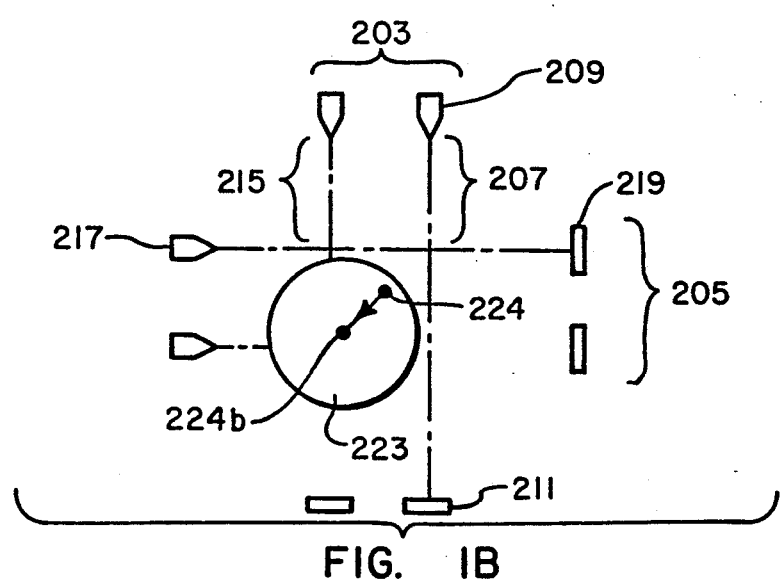
FIG. 1b is a schematic view as in FIG. 1 showing another displacement of the control shaft.

In an 8-way detector, displacement is also detected for the diagonal, or "corner" displacements, i.e. those four displacements approximately along the four lines which are 45° from the x- and y-axis. To detect a corner displacement, two photo-detectors are activated, one in the x-axis detector and one in the y-axis detector. As an example, refer to FIG. 1b, which is the same embodiment as in FIG. 1, but showing displacement of the control shaft 223 from the neutral position 224 to the down-left corner (to 224b as shown by the arrow). Sufficient light passes from corresponding photo-emitters 217, 209 to two photo-detectors 211, 219, one in the upper emitter/detector set 215 of the y-axis displacement detector 205 and the other in the right emitter/detector set 207 of the x-axis displacement detector 203. The photo-detectors 211 and 219 are activated, providing an indication of the displacement.

By choosing a construction, e.g. by changing the diameter of the control shaft (as in FIGS. 3a and 3b below), or through cams or shaped templates, which restricts or allows the motion of the control shaft, a 4-way, or 8-way detection can be achieved with the embodiment of FIG. 1. It is also contemplated that for special applications motion may be restricted for detection to only one direction on an axis, (e.g. left on the x-axis) or that motion be limited to only selected corners, and/or x- and y-axis positions.

The photo-detectors are any suitable photodetection devices, but are preferably devices that simulate an "electric switch," i.e. allowing a current to pass (a logic high) when illuminated, and resisting passage of the current (a logic low) when not illuminated. Using such devices the displacement detector mimics the action of a conventional detector with mechanical switches, such as disclosed in the Kim patent. Any such device for the photo-detector is suitable, but preferred are solid state devices, such as photodiodes, phototransistors, or photodarlingtons. Choice of a suitable device for a particular application is well within the ability of one of ordinary skill. As a general principle, the amount of current available to the detector and the amount of light available to activate the detector determines what type of device to use. For higher current applications, a photo diode is suitable, for medium current applications, a photo transistor, and for low current applications a photodarlington is suitable. It is understood that other systems are suitable, for example, a photo transistor with a transistor as an amplifier may be suitable for low current applications, but this system is less desirable because of the additional components and complexity.

Suitable photo-emitters are those commonly used in the art. It is understood that the photo-emitter and the photo-detector in a emitter/detector set must matched so that the detector is activated when light passes from the emitter to the detector and deactivated when the passage of light is blocked. The photo-detector is activated when the detector provides a signal in response to its reception of sufficient light, e.g. in the case of a photodarlington or the like, by allowing current to pass when receiving sufficient light from the photo-emitter. Preferred for the emitter are solid state devices because of their small size and low power requirements. In addition, a lower power photo-emitter can be used when the frequency of the generated light matches the frequency response of the photo-detector. For example, a suitable emitter/detector set is an infrared light emitting diode (LED) and a photodarlington sensitive to infrared light.

For an 8-way or 4-way detector as in FIG. 1, it is preferred that the two parallel light axes 213, 214 in the x-axis displacement detector 203 be in the same or a parallel plane to the light axes 221, 222 in the y-axis detector 205. However, embodiments with the parallel light axes in a detector set in a non-parallel plane to the plane defined by parallel light axes of another set are contemplated by the invention.

In the displacement detectors it is preferred that the control shaft have a circular cross-section, but there may be applications where other cross-sectional, sectional shapes are desirable. Preferably the control shaft, when it is in the neutral position, has a longitudinal axis substantially perpendicular to the plane defined by the parallel light axes in the displacement detector. While not preferred, the longitudinal axis of the control shaft may also be in a non-perpendicular alignment when in the neutral position.

The description herein has referred to joystick controls with x- and y-axis) displacement detectors. However, it is contemplated by the invention that there may be applications where more than two displacement detectors are used or place in axes not strictly corresponding to either of the x- and y-axes.

Figure 2:
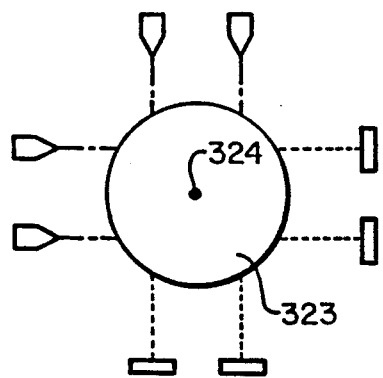
FIG. 2 is a schematic view of an embodiment of the invention similar to FIG. 1, but with a control shaft of a larger diameter.
Figure 2A:
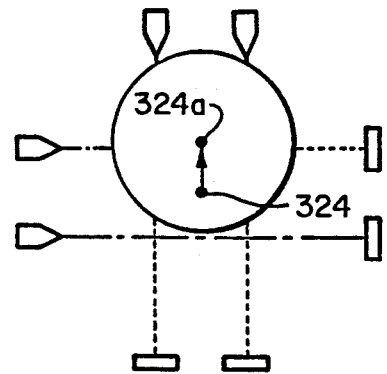
FIG. 2a is a schematic view as in FIG. 2 showing displacement of the control shaft.
Figure 2B:
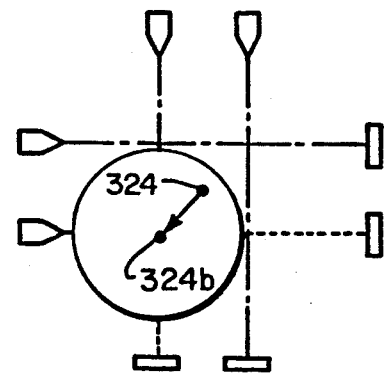
FIG. 2b is a schematic view as in FIG. 2 showing another displacement of the control shaft.
Figure 3A:
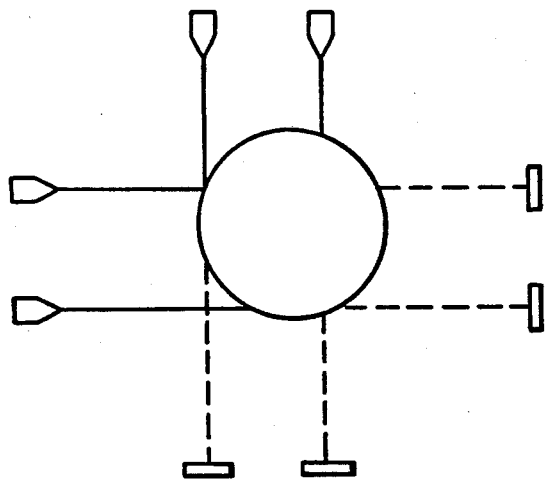
FIGS. 3a and 3b are schematic views illustrating conversion between 8-way and 4-way detection modes.

The sensitivity of a displacement detector can be determined by the geometry of the detector, largely by the distance between the light axes and the geometry and size of the control shaft. Preferably, the cross-section of the control shaft is circular, in which case the sensitivity is easily determined by the diameter of the control shaft. Referring to FIG. 2, which is the same embodiment shown in FIG. 1, except the outside diameter of the control shaft 323 is larger than that of control shaft 223 in FIG. 1. The larger diameter increases the distance of the travel of the control shaft required to unblock a light axis and provide a detection of the displacement. This can be shown by reference to FIGS. 3a and 3a, showing displacement in the same directions as in FIGS. 2a and 2b, respectively. In FIG. 2a the displacement from the neutral position 324 to 324a is larger than the corresponding distance in FIG. 1a from 224 to 224a. Likewise in FIG. 2b the displacement from the neutral position 324 to 324b is larger than the corresponding distance in FIG. 1b from 224 to 224b. This increase in travel or displacement of the control shaft results in a reduced sensitivity of the control. Since the sensitivity does not depend upon mechanical switches but depends on optical coupling, the sensitivity is uniform within the control, and it will not significantly change over time from a predetermined sensitivity. As seen above, it is simple to change the sensitivity by altering the outside diameter of the control shaft. This can be provided by a removable interchangeable bushing around the control shaft which can be replaced by a bushing with a differing outside diameter.

Figure 3B:
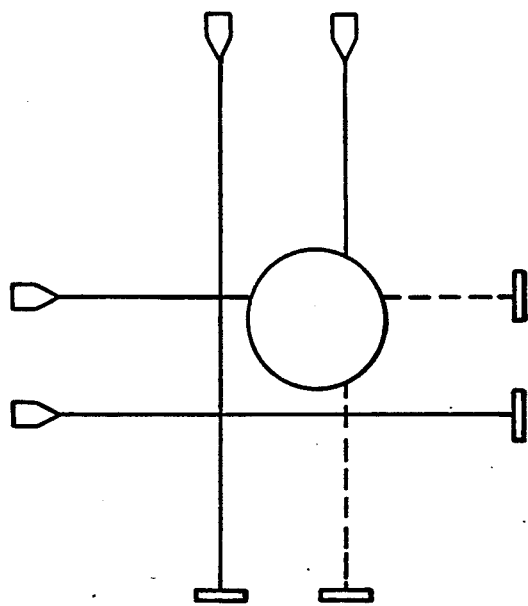

FIGS. 3a and 3b illustrate a conversion between 4-way and 8-way detection by merely altering the diameter of the control shaft. The diameter is preferably changed by using bushings which can be easily slid off the control shaft and replaced with another bushing of with a different outside diameter. Referring FIG. 3a, which shows 4-way detection the control shaft has been placed in the extreme 45° upper-right position, where the control shaft is at its maximum distance from the neutral position. At this position, neither the x-axis detector nor the y-axis detector show a displacement. However, it can be seen that a slight displacement from the 45° angle will cause a detection by either the x-axis or the y-axis detector, but not both detectors at the same time. Referring to FIG. 3b, which shows 8-way detection, the control shaft is in the same position as in FIG. 3a, but because of the reduced diameter of the control shaft both the x-axis and the y-axis detectors show a displacement. As the control shaft in FIG. 3b is moved to a directly vertical position from the neutral, only the y-axis detector shows displacement, and further to the left, both the x-axis and y-axis detectors show a displacement. Thus, by moving the control shaft through a complete circle, displacement detection in eight directions is provided.

Figure 4A:
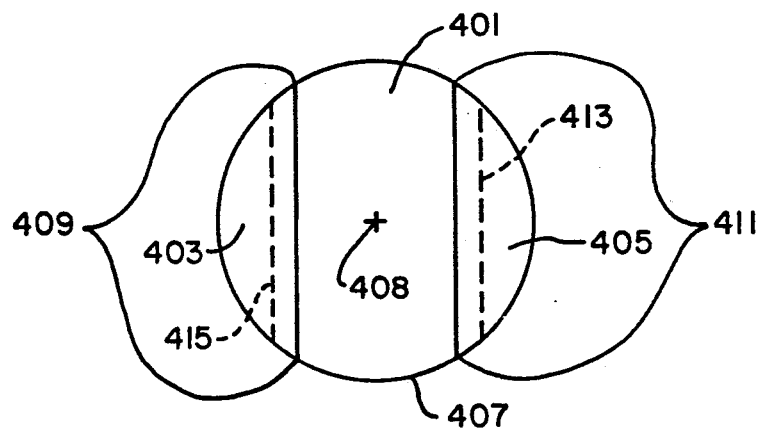
FIG. 4a is a sector switching chart for an x-axis detector.
Figure 4B:
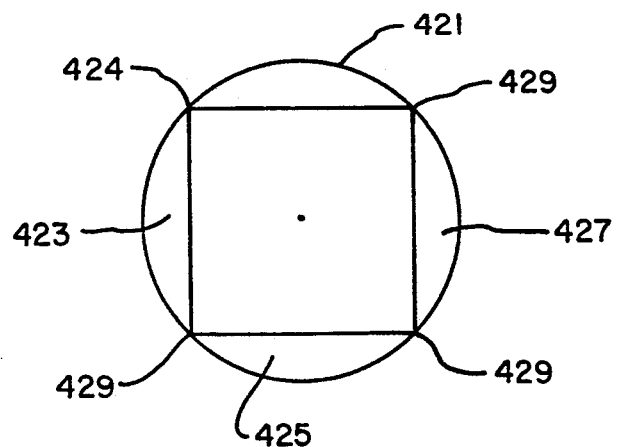
FIGS. 4b, and 4c are sector switching charts illustrating 4-way and 8-way detectors of the invention.
Figure 4C:
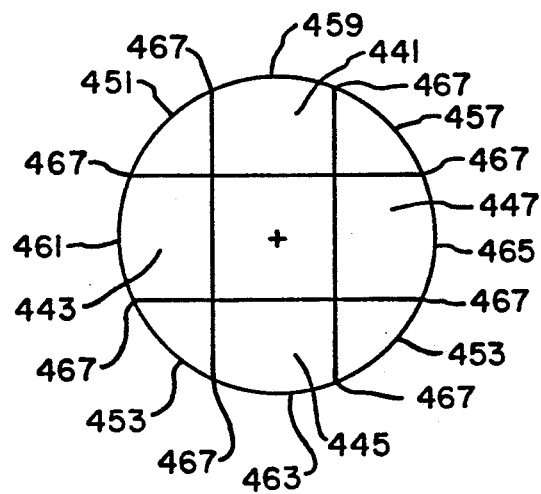

Referring to the switching sector chart 4a, which illustrates only an x-axis detector, the middle area 401 represents an area of no detection, whereas the left and right half-moon areas 403, 405 represent detection to either the left or the right. The perimeter 407 of the circle represents the extreme or furthest possible travel of the control shaft from its neutral position 408, and sectors 409, 411 of the perimeter 407 where displacement is indicated are referred to switching gates for left and right respectively. By increasing the diameter of the control shaft the inner boundaries of the detection areas are moved to the left of the right, as shown by the dotted-lines 413, 415, decreasing the size of the left and right switching gates 409, 411. In FIG. 4b, the switching sectors for the both the x-axis and y-axis detectors have been superimposed, showing a up (421), left (423), down (425), and right (427) switching sectors respectively. Note that boundaries 429 between the switching gates for up, left, down, and right are positioned substantially 90° from each other, providing a precise consistent 4-way detection. In FIG. 4c, which is a switching sector chart for a detector with a smaller diameter control shaft than in FIG. 4b, the up, left, down, and right detection areas 441, 443, 445, 447 overlap providing switching sectors for the upper-left (451), lower-left (453), lower-right (455), and upper-right (457) positions as well as up (459), left (461), down (463), and right (465). The boundaries 467 between the switching gates are substantially 45° from each other providing a precise 8-way detection. Precise 4-way and 8-way detection in this manner is not possible with mechanical switches. Because of the inconsistence between switches as manufactured and the variation due to switch bounce and mechanical wear, it is very difficult to achieve substantially equal switching sectors as in the present invention. The result is that for such mechanical switch-detectors, there are unequal switching gates, dead spots and gray areas where switching may or may not occur.

In order for the displacement detector to function properly, it is important to eliminate "cross-talk" or cross-interference between emitter/detector sets. This can be accomplished by means for a photo-detector to detect light selectively from its corresponding photo-emitter in a emitter/detector set. If a photo-detector is activated by light from a photo-emitter not in its set or light from outside sources, a false reading will result. The measures required to prevent cross-talk will vary, but will depend, for example, on the light intensity and placement of the photo-emitters, the light intensity required to activate the photo-detectors, the intensity of the ambient light, and geometrical and dimensional factors. A preferred method of preventing cross-talk is to provide a narrowing means for narrowing the light beam of the photo-emitters along the light axis, and/or to provide a limiting means to limit reception of light to the photo-detector to light coming from the general direction along the light axis. Suitable narrowing and limiting means are focusing and collimation lenses. Photo-emitters and photo-detectors are available with such lenses integral to the device.

Figure 5:
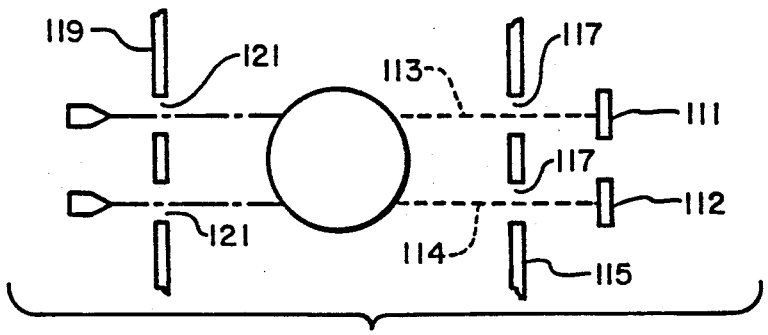
FIG. 5 is a schematic view of a y-axis detector of an embodiment of the invention similar to that shown in FIG. 1, but including shielding means to prevent cross-interference.

A preferred narrowing and limiting means for eliminating cross-talk is a shielding means for either one or both of the photo-emitter and photo-detector in the emitter/detector set. The shielding means include an aperture or apertures aligned on the light axis, so that in the case of a photo-detector, light is received only through the aperture along the light axis; in the case of the photo-emitter, the aperture allows light to only be sent through the aperture along the light axis. FIG. 5 shows only the y-axis detector an embodiment of the invention which is the embodiment of FIG. 1 additionally comprising shielding means 115, 119. Shown are the photo-detectors 111, 112 with photo-detector shielding means 115 which has apertures 117 aligned on the light axes 113, 114. Also shown are the photo-emitters 109, 110 with photo emitter shielding means 119 which has apertures 121 aligned on the light axes 113, 114. For sensitive photo-detectors it may be necessary to provide a housing (not shown) to also prevent ambient light from being detected. In addition, the surfaces of any shielding means, housing, and of the control shaft are preferably non-reflective, (e.g. flat black).

Figure 6:
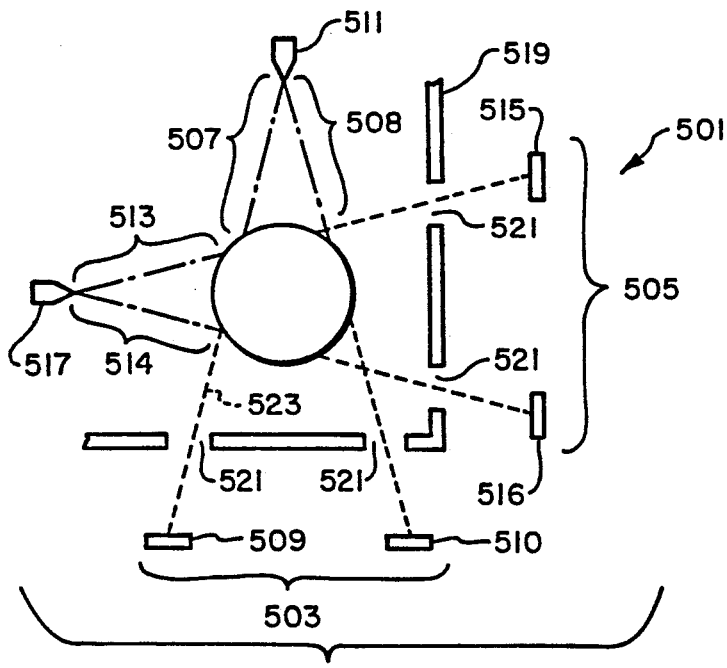
FIG. 6 is a schematic view of an another embodiment of the invention.

In FIG. 6, is shown an alternate embodiment of an detector suitable for 4-way and/or 8-way detection. Shown is a photoelectric control device comprising an x-axis displacement detector 503 and a y-axis displacement detector 505. The x-axis detector 503 comprises two photo-emitter/detector sets 507, 508, each set 507, 508 comprising a photo-detector 509, 510 with a single photo-emitter 511 common to set 507 and set 508. The y-axis detector likewise comprises two photo-emitter/detector sets 513, 514 with each set 513, 514 comprising a photo detector 515, 516 and single photo emitter 517, common to set 513 and set 514. A means may be required, as discussed above, to limit light detection of the photo-detectors selectively to light from corresponding photo-emitters (509 and 510 from 511, and 515 and 516 from 517). For example the photo-detectors 509, 510, 515, 516 may be provided with lenses. In FIG. 6 is illustrated the use of shield means 519. In FIG. 6 the photo-emitters 511, 517, in this embodiment emit light as a broad beam in order to be detected by both photo-detectors in the same displacement detector 503 or 505. In order to prevent cross-talk between the two sets, a shielding means 519 for the photo-detectors 509, 515 with apertures 521 aligned on the light axes 523 is provided.

Figure 7:
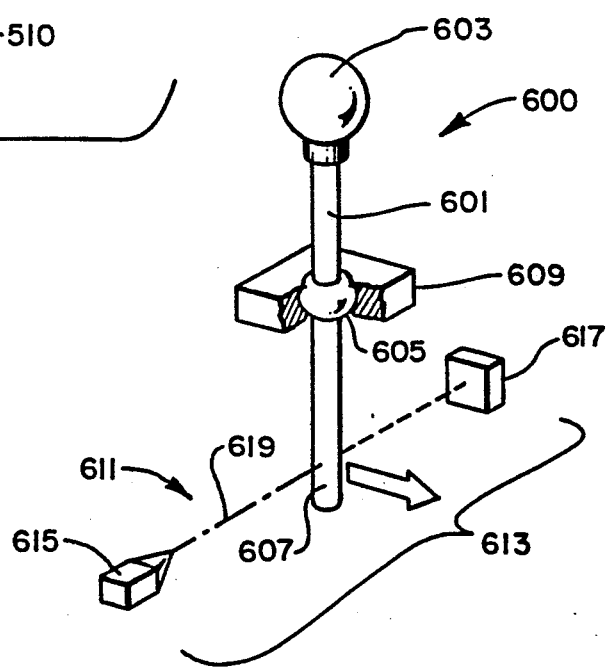
FIG. 7 is a simplified perspective view showing a joystick of the invention.

FIG. 7, shows a joystick control device 600 according to the invention. Shown is a joystick 601 comprising a handle end 603 adapted for user manipulation, a pivot point 605, and a control shaft portion 607. A mounting means 609 is cooperatively attached to the joystick pivot point 605 to permit angular movement of the joystick 601 around the pivot point by manipulation of the handle end 603. A displacement detector 611 is provided, which may be any displacement detector according to the invention. For simplicity, displacement detector 611 is shown with only one emitter/detector set 613, comprising a photo-emitter 615 and a photo-detector 617 with the photo-detector 617 aligned on a light axis 619 to detect light traveling along the light axis 619 from the photo-emitter 615 to the photo-detector 617. The displacement detector 611 and the control shaft portion 607 are disposed to permit the displacement detector 611 to detect displacement of the control shaft portion 607 from a neutral position blocking passage of light from the photo-emitter 615 to the photo-detector 617 along the light axis 619. Sufficient displacement of the control shaft portion 607 by manipulation of the handle end 603 from the neutral position away from the light axis 619 (as shown by the arrow) allows passage of sufficient light from the photo-emitter 615 to the photo-detector 617 along the light axis 619 to provide a detection of the displacement. It is understood that FIG. 7 is illustrative of a typical joystick construction, and that the detector of the invention may be used on any suitable device wherein detection of a control shaft is required. In addition, construction of the joystick may vary. For example, the control shaft portion may be disposed between a handle means and a pivot means, the pivot means may be displaced from the longitudinal axis of the joystick, and any portion of the joystick may be curved or angled.

By practice of the invention, it is possible to construct a displacement detecting control which is a direct replacement for the mechanical displacement detection systems of several commercially produced joysticks for arcade games. Below is described an illustration of a control module adapted to replace the mechanical switches of a commercial version of the joystick control device described in the above U.S. Pat. No. 4,436,971 to Kim (which is hereby incorporated by reference), and sold by the WICO Corporation. The switch assemblies of other commercial joystick typically have a similar arrangement of four mechanical control switches with a control shaft extending between the switches. Therefore, similar replacement modules can be manufactured in a like manner for these joysticks.

Figure 8:
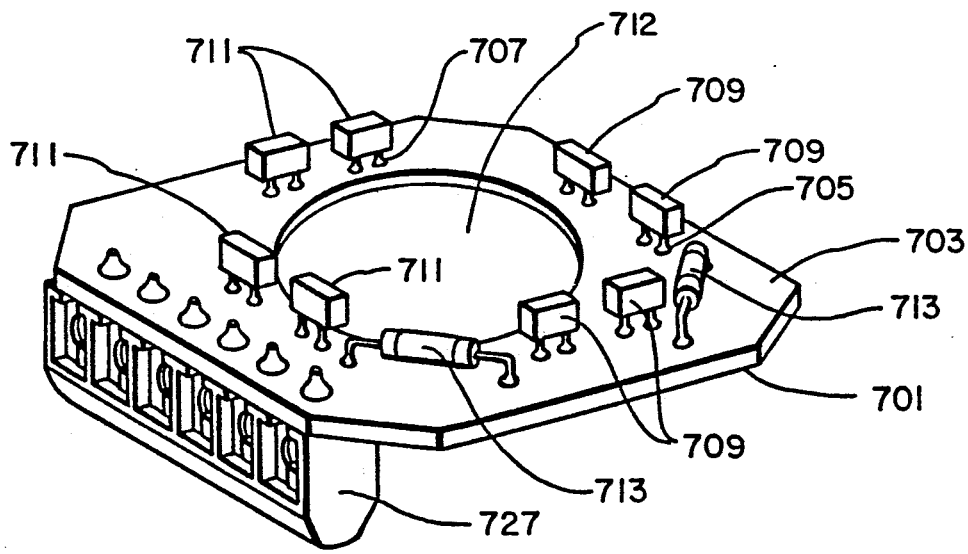
FIG. 8 is a perspective view showing a circuit board assembly for an embodiment of the invention.
Figure 9:
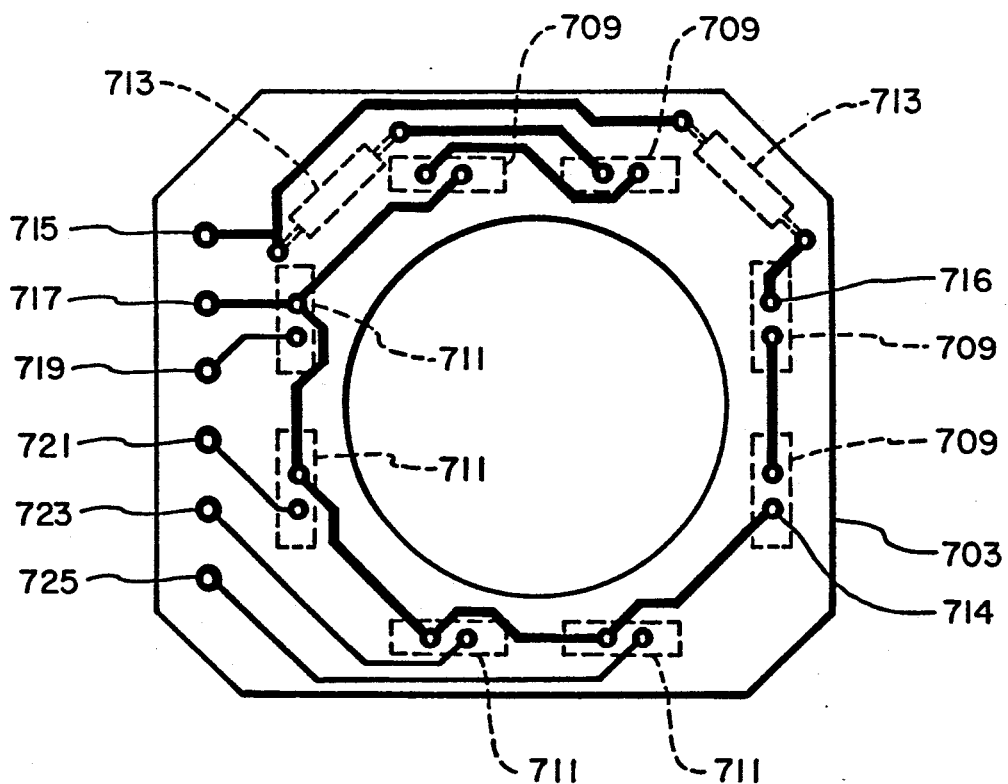
FIG. 9 is a plane view of the circuit board of FIG. 8.

FIGS. 8, and 9, show a circuit board assembly and circuit board diagram for an embodiment of the invention. Referring to FIG. 8, circuit board assembly 701 has a circuit board 703 with holes 705 for inserting and soldering the leads 707 of the photo emitters 709 and the photo-detectors 711, and an aperture 712 adapted to receive a control shaft (not shown). The photo-emitters 709 and photo-detectors 711 are of the side view style, so when inserted and soldered into the circuit board the leads are perpendicular to the light axes of the emitter/detector sets. Thus, when mounted the photo-emitters 709 and photo-detectors assume their correct operable position around aperture 712 without the use of special right-angle posts or mountings, and without further adjusting. A suitable photo-emitter 709 is Motorola LED No. MLED71 and a suitable photo-detector 711 is Motorola photodarlington No. MRD711.

FIG. 9 shows the solder side of the circuit board 703 from FIG. 8, with the components mounted on the other side board shown in phantom. The photo-emitters 709 are connected to a +5 volt supply through two parallel circuits, each circuit with two emitters 709 and a current limiting resistor 713 (about 50 ohms) connected in series. Other circuits are suitable, such as a common resistor for the four photo-emitters, or other parallel or series arrangements, depending upon the characteristics of the particular components used, and the characteristics of the power supply. The photo-detectors 711 are electrically connected on the anode side 714 to a ground and the cathode side 716 to a +5 volt terminal for each displacement indication. (Typically the control circuits for arcade game CPUs are a +5 volts logic high to a logic low.) The terminals for +5 volt power 715, ground 717, and the terminals for displacement indication, i.e. up 719, down 721, left 723, and right 725, are adapted for attachment to a terminal strip or block (see 727 in FIG. 8) (such as WICO ™ terminal block no. 94).

Figure 10:
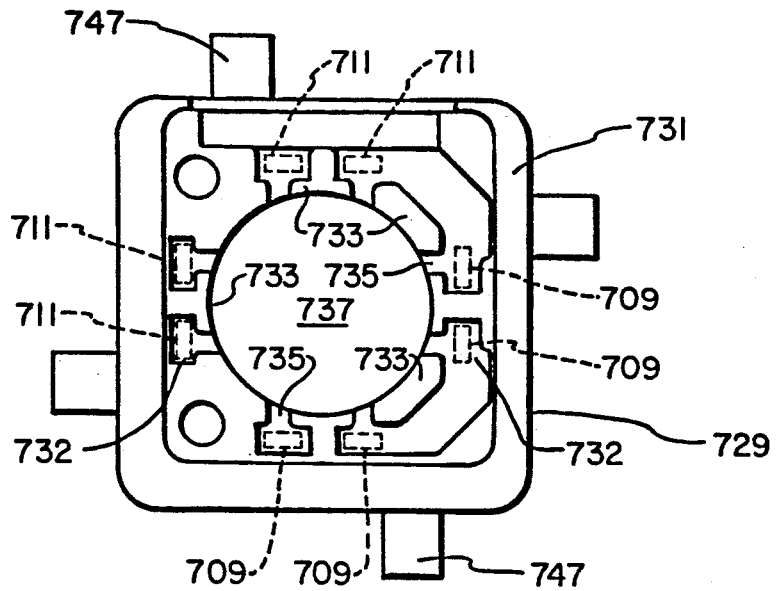
FIG. 10 is a plane view of a housing adapted for assembly with the circuit board assembly of FIG. 8.

FIG. 10, is a plane view of an integral housing and shielding means 729 adapted for use with the circuit board assembly 701 shown in FIGS. 8 and 9. The positions of the photo-emitters 709 and photo-detectors 711 when the integral housing and shielding means 729 is assembled with the circuit board assembly are shown in phantom. Shown are a housing means 731 to block out ambient light, and a shielding means 733 to prevent cross-talk. The housing means 731 and shielding means 733 define cavities 732 to receive the photo-emitters 709 and photo-detectors 711. The cavities 732 may also be dimensioned to receive other components on the circuit board as necessary, such as the resistors 713 (in FIG. 7). Shield apertures 735 extend from cavities 732 through the shielding means 733 to control shaft aperture 737, which is adapted to receive the control shaft (not shown) when assembled with a joystick mechanism. The shield apertures 735 are aligned along the light axes (not shown) between the photo-emitters 709 and photo-detectors 711. The inner dimensions of the housing means 731 are such to receive the circuit board assembly 701 (FIG. 7) with the circuit board control shaft aperture 712, and the integral means control shaft aperture 737 centered on a common axis. This provides automatic alignment for the photo-detectors 711 and photo-emitters 709 in the integral means 729, such that when assembled with a joystick mechanism, the control shaft is then properly disposed in a neutral position between the photo-emitters 709 and photo-detectors 711. Also shown in FIG. 9 are mounting abutments 747, adapted for mounting on a joystick mechanism.

Figure 11:
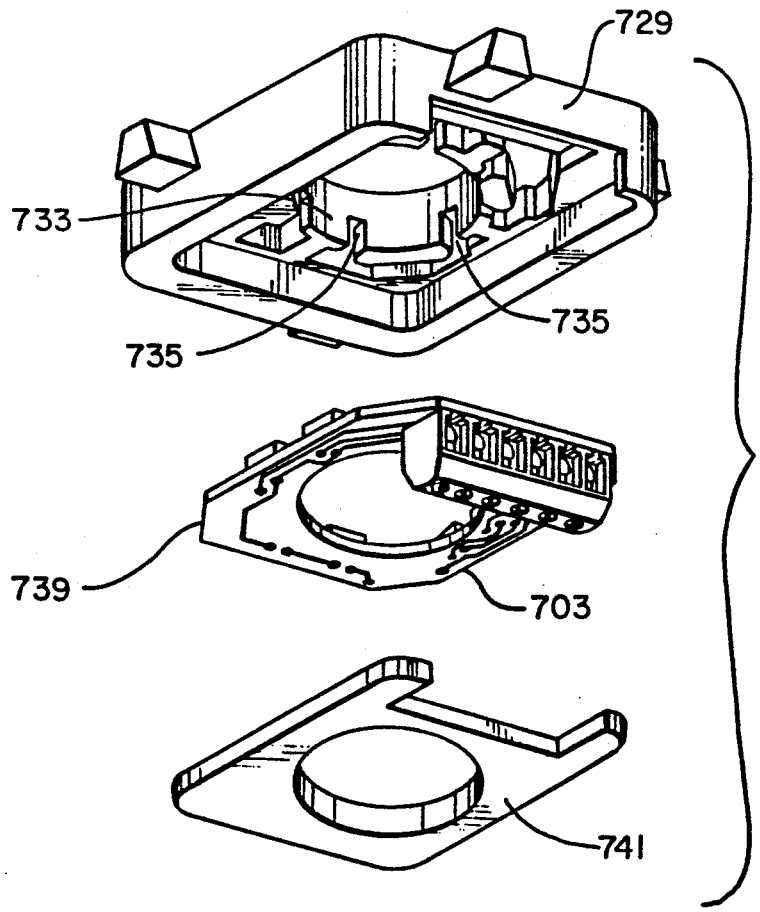
FIG. 11 is an exploded view of the assembly of a joystick control module which includes the circuit board assembly of FIG. 9, and the housing of FIG. 10.

FIG. 11 is an exploded perspective view showing the circuit board assembly 703 of FIG. 7, and the integral means 729 of FIG. 9 into a control module 739. Also shown is a cover 741, which, when assembled, further blocks out ambient light and assists in securing the circuit board assembly 703 in the integral means 729. The integral means 729 and the cover 741 may be manufactured with an injection molding process of a flat black plastic material. Shown in FIG. 10 are slit-like shield apertures 735 in the shielding means 733. However, other suitable shapes, such as circular, are suitable.

Figure 12A:
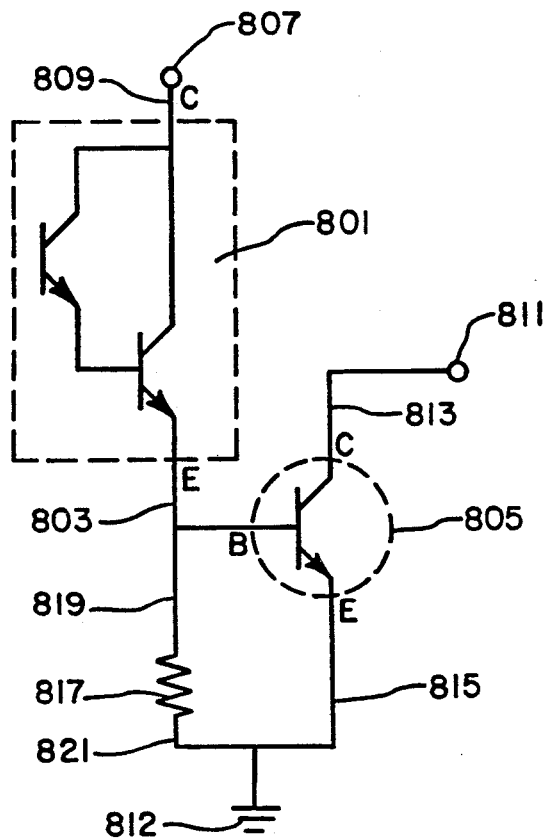
FIG. 12a and 12b are circuit diagrams for a preferred embodiment of the invention.
Figure 12B:
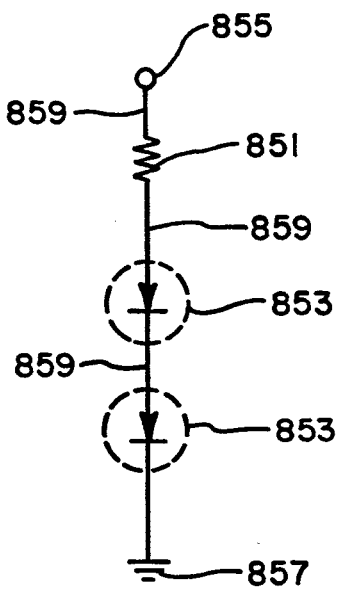

FIGS. 12a and 12b are a circuit diagrams of preferred photo-detectors and photo-emitters of the invention. Preferably, these circuits are incorporated into a circuit board of the same general physical dimension as shown in FIGS. 8 and 9 for use in the control module 739 shown in FIG. 11. In the circuit for the detector shown in FIG. 12a, the emitter leg of a photodarlington 801 is connected by conductor 803 to the base of a n-p-n transistor 805, and the photodarlington 801 collector to a +5 volt power source 807 by conductor 809. The collector of the transistor 805 is connected to the +5 Volt logic control 811 and the emitter to ground 812 by conductors 813 and 815 respectively. The photodarlington is preferably a Motorola #MRD711. The transistor may be any suitable low voltage n-p-n transistor, such as a Motorola #2N3904. A resistor 817 is connected between the base and the ground 812 by conductors 819 and 821. 3.9K ohms has been found suitable for most applications, however, the resistance may be adjusted to compensate for variation in the sensitivity in the emitter/detector set. With these components, it is possible to reduce the voltage the +5 volt logic control from a +5 volt logic high to a logic low of less than 0.2 volts when sufficient light falls upon the photodarlington.

FIG. 12b, the photo-emitter circuit, shows an 82 ohm (¼ watt) resistor 851 and two emitters 853 connected in series across a +5 volt power source 855 and a ground 857 by conductors 859. In each control there is normally four photo-detector circuits, and two photo-emitter circuits to provide both an x-axis displacement detector and a y-axis displacement detector.

Figure 13:
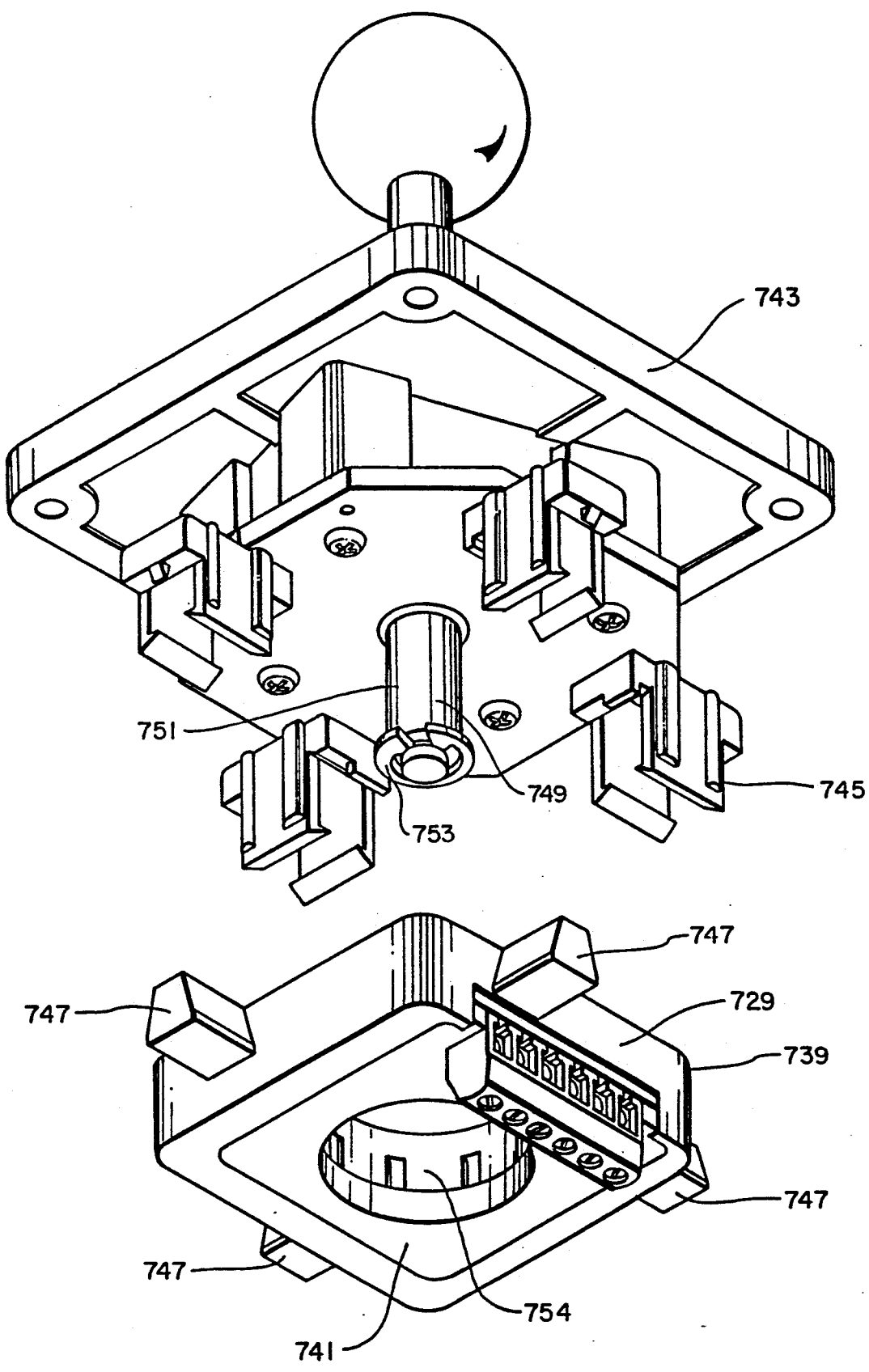
FIG. 13 is an exploded view of the assembly shown in FIG. 11 and a commercial joystick control unit.

FIG. 13 is an exploded view showing the assembled control module 739 of FIG. 11 and a joystick mechanism. The joystick mechanism 743 is a WICO TM joystick (No. 15-945401) without its usual mechanical switches. Shown is how control module 739 and joystick mechanism 743 are assembled together into a joystick control 744. In the illustrated WICO joystick mechanism 743, mechanical switches are typically attached to a snap mounting structures 745 as described and claimed particularly in the Kim patent. As shown in FIG. 13, the control module 739 of the invention has a mounting means in the form of abutments 747 extending from the integral means 729, which cooperate with the snap mounting structures 745. Upon assembly, the control shaft 749 of the joystick 743 extends into the control shaft aperture 754 of the integral means 729 and is disposed in the neutral position within the control module 739. The control shaft 749 also has a removable bushing 751 secured by a suitable locking means 753, such as a C-clip. The removable bushing 751 may be removed and replaced by a bushing with a different outside diameter to change the sensitivity of the displacement detection.

Figure 14:
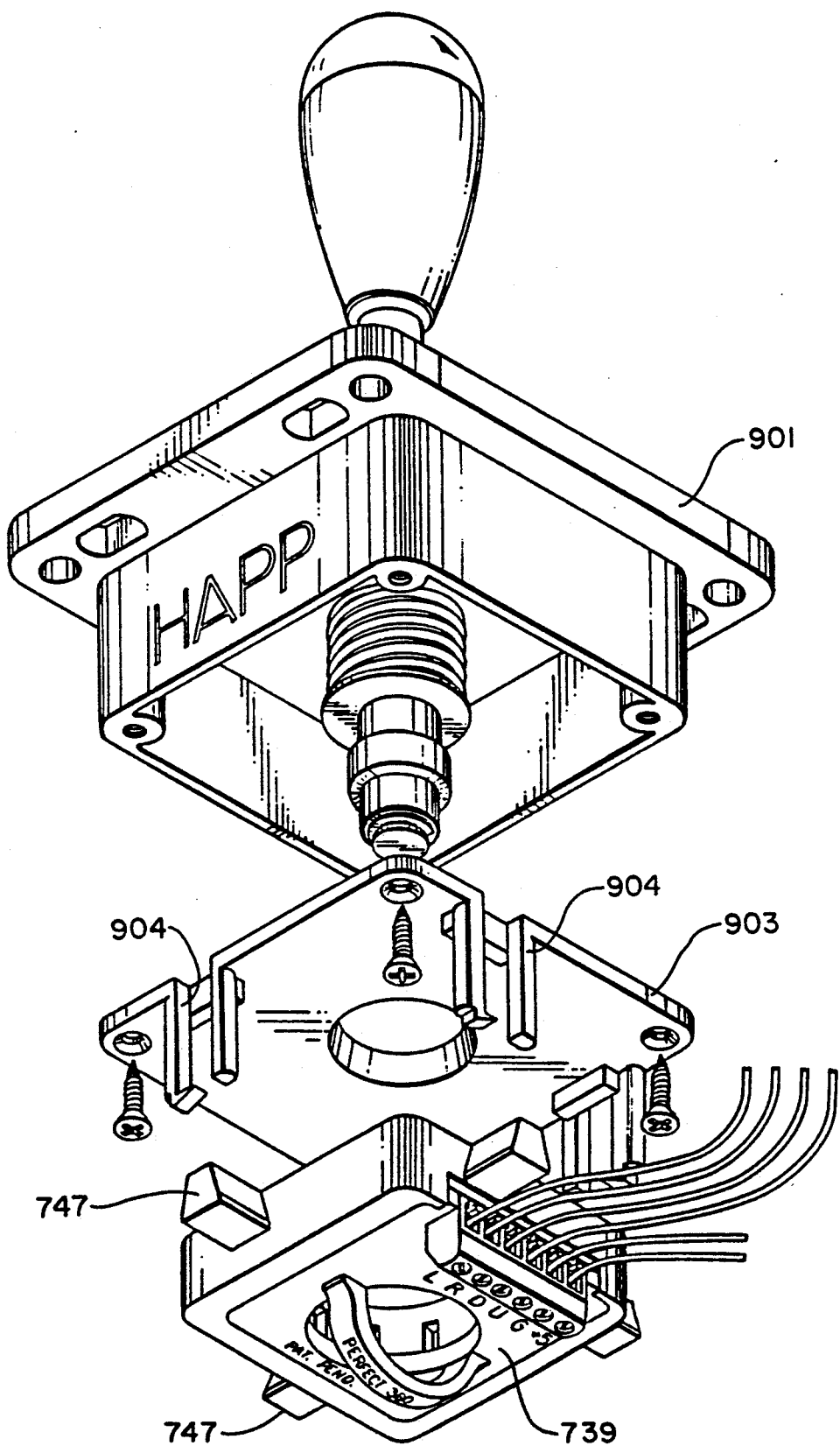
FIG. 14 is an exploded view of the assembly shown in FIG. 11 and another commercial joystick control unit.

Other commercially joystick assemblies can usually easily be modified to receive the above described displacement control module by use of an adapter means, such as an adapter plate, or the like. The adapter means comprises means to mount it on the joystick assembly in the same manner usually used to mount the mechanical control mechanism. In addition the adapter means has means which cooperate with a portion of the control module of the invention to rigidly mount the control module to the joystick assembly. As an illustration refer to FIG. 14. Shown a commercially constructed joystick mechanism 901 (HAPP TM) without the normal mechanical detector mechanisms. An adapter plate 903 comprises holes to mount the adapter plate with screws which were used to mount the mechanical detector mechanisms. The mounting plate comprises snap mounting structures 904 which interlock with the abutments 747 on the control module of the invention 739.

As can be seen by the above discussion, a reliable and consistent photoelectric joystick control system is achieved by practice of the invention without complex conditioning circuits, potentiometers, or integrated circuits. The system of the invention simulates the simple control system of a mechanical switch system, and is therefore adaptable to existing systems with little or no redesign of such system. In addition, the construction is simple and can be mass produced at a relatively low expense.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. In is also understood that the present invention is applicable to any application, such as industrial controls, toys, vehicle directional control, or the like, where a arcade-like 4-way or 8-way digital output from the controller is used.

What is claimed is:

1. A photoelectric control device for determining the displacement of a control shaft, which device comprises;
    (a) an x-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another,
    (b) a y-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, wherein the light axes of the emitter/detector sets of the x-axis detector and the light axes of the emitter/detector sets of the y-axis detector are substantially perpendicular to each other, and the plane defined by the parallel light axes of the x-axis emitter/detector sets and the plane defined by the parallel y-axis emitter/detector sets are adapted to be disposed in a substantially perpendicular to the longitudinal axis of a control shaft when the control shaft is in the neutral position, and wherein the x-axis detector and the y-axis detector are adapted to detect displacement of the control shaft from a neutral position blocking passage of light from each photo-emitter to the corresponding photo-detector in the emitter/detector set, and the displacement of the control shaft from the neutral position allows passage of sufficient light from a photo-emitter to activate the corresponding photo-detector in at least one emitter/detector set.

2. The device of claim 1 wherein the device is an integral assembly and additionally comprises an emitter shield means to narrow the light beam from each photo-emitter, a detector shield means for each photo-detector to shield the photo-detector from light not travelling along the light axis, a housing means to inhibit ambient light from reaching one or more of the photo-detectors, and a mounting means for mounting the device upon a joystick assembly.

3. The device of claim 2 wherein the housing means and shielding means are manufactured into the integral assembly as one piece of a plastic material by an injection molding process.

4. The device of claim 1 wherein said device additionally comprises an integral assembly which comprises a housing means to inhibit ambient light from reaching one or more of the photo-detectors, a shielding means, a control shaft aperture adapted to receive the control shaft, and cavities defined by the housing means and shielding means adapted to receive the photo-emitters and photo-detectors, with apertures extending between the cavities and the control shaft aperture through the shielding means and aligned along the light axes, such that each photo-detector receives light selectively from its corresponding photo-emitter in a emitter/detector set through the apertures.

5. The device of claim 1 additionally comprising an integral assembly including a housing to inhibit ambient light from reaching one or more of the photo-detectors, a shielding means, a control shaft aperture adapted to receive the control shaft, and cavities defined by the housing means and shielding means adapted to receive the photo-emitters and photo-detectors, with apertures extending between the cavities and the control shaft aperture through the shielding means and aligned along the light axes, such that each photo-detector receives light selectively from its corresponding photo-emitter in a emitter/detector set through the apertures, the housing so dimensioned to receive a circuit board assembly with the photo-emitters and photo-detectors mounted thereon, such that when the circuit board assembly is disposed within the housing means and the photo-emitters and photo-detectors are disposed in the cavities of the housing means.

6. The device of claim 1 further comprising means for the photo-detectors to selectively detect light from the corresponding photo-emitter in a emitter/detector set.

7. The device of claim 6 wherein the selective detecting means comprises a narrowing means for narrowing the beam emitted by one or more photo-emitters along its corresponding light axis.

8. The device of claim 7 wherein the narrowing means comprises a shield with an aperture, the aperture being on an axis corresponding to the light axis.

9. The device of claim 6 wherein the selective detecting means comprises a shield means around one or more photo-detectors to inhibit each photo-detector from detecting light not transmitted along its corresponding light axis.

10. The device of claim 1 wherein the photo-detector allows electrical current to pass when receiving light from the photo-emitter, and inhibits the flow electrical current when light from the photo-emitter is blocked.

11. The device of claim 1 wherein at least one photo-detector is a photodarlington.

12. The device of claim 1 wherein at least one photo-detector is a phototransistor.

13. The device of claim 1 wherein at least one photo-detector is a photodiode.

14. The device of claim 1 wherein at least one photo-emitter is a light emitting diode.

15. The device of claim 1 wherein at least one of the photo-detectors are mounted with the electrical leads substantially perpendicular to the light axis.

16. The device of claim 15 wherein at least one photo-detector and at least one photo-emitter are mounted directly upon a circuit board.

17. The device of claim 2 wherein at least one photo-detector and at least one photo-emitter are mounted directly upon a circuit board which is adapted to fit within the integral assembly.

18. A joystick control device comprising;
(1) a joystick comprising a handle end adapted for user manipulation, a pivot point, and a control shaft portion,
(2) a joystick mounting means cooperatively attached to the joystick pivot point to permit angular movement of the joystick around the pivot point by manipulation of the handle end wherein the control shaft portion is displaced by the angular movement,
(3) a displacement detector comprising;
(a) an x-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another,
(b) a y-axis detector comprising two photo-emitter/detector sets, each set comprising a photo-emitter and a photo-detector with the photo-detector aligned on a light axis to detect light traveling along the light axis and emitted from the photo-emitter, with the light axes of the two sets disposed substantially parallel to one another, wherein the light axes of the emitter/detector sets of the x-axis detector and the light axes of the emitter/detector sets of the y-axis detector are substantially perpendicular to each other, and the plane defined by the parallel light axes of the x-axis emitter/detector sets and the plane defined by the parallel y-axis emitter/detector sets are disposed substantially perpendicular to the longitudinal axis of the control shaft when the control shaft is in the neutral position, and wherein the x-axis detector and the y-axis detector are adapted to detect displacement of the control shaft from a neutral position blocking passage of light from each photo-emitter to the corresponding photo-detector in the emitter/detector set, and the displacement of the control shaft from the neutral position allows passage of sufficient light from a photo-emitter to activate the corresponding photo-detector in at least one emitter/detector set.

19. The joystick control device of claim 18 wherein the displacement detector additionally comprises an integral assembly which comprises an emitter shield means to narrow the light beam from each photo-emitter, a detector shield means for each photo-detector to shield the photo-detector from light not travelling along the light axis, a housing means to inhibit ambient light from reaching one or more of the photo-detectors, and a mounting means for which cooperatively interlocks with a portion of the joystick mounting means to fixedly attach the displacement detector upon the joystick assembly.

20. The joystick control device of claim 18 wherein the control shaft portion includes a means for changing the outside diameter of the control shaft portion.

21. The joystick control device of claim 20 wherein the means for changing the outside diameter of the control shaft portions comprises a removable bushing.

* * * * *